(12) United States Patent
Berker et al.

(10) Patent No.: US 8,276,709 B2
(45) Date of Patent: Oct. 2, 2012

(54) TRANSPORTATION VEHICLE SOUND INSULATION PROCESS AND DEVICE

(75) Inventors: Ali Berker, Saint Paul, MN (US); Richard W. Greger, Saint Paul, MN (US); Marie Aloshyna ep Lesuffleur, Woodbury, MN (US); Michael Patrick M. Mandanas, Little Canada, MN (US); Sanat Mohanty, Woodbury, MN (US); David A. Ylitalo, Stillwater, MN (US); Patrick G. Zimmerman, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/140,577

(22) PCT Filed: Dec. 16, 2009

(86) PCT No.: PCT/US2009/068237
§ 371 (c)(1),
(2), (4) Date: Jun. 17, 2011

(87) PCT Pub. No.: WO2010/075130
PCT Pub. Date: Jul. 1, 2010

(65) Prior Publication Data
US 2011/0247893 A1 Oct. 13, 2011

Related U.S. Application Data

(60) Provisional application No. 61/140,413, filed on Dec. 23, 2008.

(51) Int. Cl.
*E04B 1/82* (2006.01)
(52) U.S. Cl. .................................................... 181/286
(58) Field of Classification Search ............... 181/286
See application file for complete search history.

(56) References Cited

U.S. PATENT DOCUMENTS

| 5,188,123 A | 2/1993 | Gardner, Jr. |
| 5,203,352 A | 4/1993 | Gardner, Jr. |
| 5,792,998 A | 8/1998 | Gardner, Jr. et al. |

(Continued)

FOREIGN PATENT DOCUMENTS

JP 2006-106211 4/2006

(Continued)

OTHER PUBLICATIONS

Sigalas, M., et al., "Classical vibrational modes in phononic lattices: theory and experiment," Z. Kristallogr, vol. 220, pp. 765-809 (2005).

(Continued)

*Primary Examiner* — Forrest M Phillips
(74) *Attorney, Agent, or Firm* — Adam Bramwell

(57) ABSTRACT

A sound insulation process comprises (a) providing at least one sound insulation device comprising at least one sound barrier comprising at least one substantially periodic array of structures disposed in a first medium having a first density, the structures being made of a second medium having a second density different from the first density, wherein one of the first and second media is a viscoelastic medium having a speed of propagation of longitudinal sound wave and a speed of propagation of transverse sound wave, the speed of propagation of longitudinal sound wave being at least about 30 times the speed of propagation of transverse sound wave, and wherein the other of the first and second media is a viscoelastic or elastic medium; and (b) interposing the sound insulation device between an acoustic source area and an acoustic receiving area of a transportation vehicle.

19 Claims, 4 Drawing Sheets

U.S. PATENT DOCUMENTS

| | | | |
|---|---|---|---|
| 2003/0062012 | A1 | 4/2003 | Homsi et al. |
| 2005/0283882 | A1 | 12/2005 | Berger et al. |
| 2007/0143907 | A1 | 6/2007 | Hansson et al. |
| 2008/0264715 | A1 | 10/2008 | Leong et al. |

FOREIGN PATENT DOCUMENTS

| | | |
|---|---|---|
| JP | 2006-257993 | 9/2006 |
| JP | 2007-015292 | 1/2007 |
| WO | 2005044630 | 5/2005 |
| WO | 2009085724 | 7/2009 |
| WO | 2010151533 | 12/2010 |

OTHER PUBLICATIONS

J.O. Vasseur, P.A. Deymier, A. Khelif, Ph. Lambin, B. Dajfari-Rouhani, A. Akjouj, L. Dobrzynski, N. Fettouhi, and J. Zemmouri, "Phononic crystal with low filling fraction and absolute acoustic band gap in the audible frequency range: A theoretical and experimental study," Phys. Rev. E 65, 056608-1-056608-6 (May 2, 2002).

Goffaux et al., "Comparison of the sound attenuation efficiency of locally resonant materials and elastic band-gap structures," Physical Review B, vol. 70, 184302-1-184302-6 (Nov. 18, 2004).

Hsu et al., "Lamb waves in binary locally resonant phononic plates with two-dimensional lattices," Applied Physics Letters, vol. 90, No. 20, pp. 201904-1-201904-3, ISSN: 0003-6951 (May 15, 2007).

Olivieri et al., "Measurement of transmission loss of materials using a standing wave tube," Inter-Noise 2006, Dec. 3-6, 2006, Honolulu, Hawaii USA.

Ph. Lambin, A. Khelif, J.O. Vasseur, L. Dobrzynski, and B. Djafari-Rouhani, "Stopping of acoustic waves by sonic polymer-fluid composites," Phys. Rev. E. vol. 63, pp. 066605-1-066605-6 (May 22, 2001).

U.S. Department of Transportation, Federal Aviation Administration, Advisory Circular No. 25.856-1, "Thermal/Acoustic Insulation Flam Propagation Test Method Details," Jun. 24, 2005.

J.O. Vasseur et al., "Experimental evidence for the existence of absolute acoustic band gaps in two-dimensional periodic composite media", Journal Physics: Condens, Matter 10, PII: 50953-8984(98)93210-6, pp. 6051-6064 (Apr. 9, 1998).

Merheb et al., "Elastic and viscoelastic effects in rubber/air acoustic band gap structures: A theoretical and experimental study", Journal of Applied Physics, 104, (2008).

TRANSPORTATION VEHICLE SOUND INSULATION PROCESS AND DEVICE

CROSS REFERENCE TO RELATED APPLICATIONS

This application is a national stage filing under 35 U.S.C. 371 of PCT/US2009/068237, filed Dec. 16, 2009, which claims priority to Provisional Application No. 61/140,413, filed Dec. 23, 2008, the disclosure of which is incorporated by reference in its/their entirety herein.

FIELD

This invention relates to sound insulation processes useful in transportation vehicles (for example, airplanes, automobiles, trains, and boats) and, in another aspect, to devices for use in providing sound attenuation or insulation therein.

BACKGROUND

Sound proofing materials and structures have important applications in the transportation industry. For example, it is generally considered to be desirable to reduce the level of noise within a vehicle passenger compartment. Noises such as road noise, wind noise, engine noise, vibrations, and so forth, as well as noises emanating from within passenger compartments, can be attenuated through the use of various acoustically absorptive or reflective materials. Such materials can be included, for example, in headliners, trunk liners, hood liners, dash mats, interior panels, or carpeting and other decorative or functional vehicular facing materials to provide enhanced noise reduction in vehicle interiors.

Traditional materials used in the sound insulation industry, such as absorbers and reflectors, are usually active over a broad range of frequencies without providing frequency selective sound control. Active noise cancellation equipment allows for frequency selective sound attenuation, but it is typically most effective in confined spaces and requires an investment in, and operation of, electronic equipment to provide power and control.

Traditional sound-absorbing materials (for example, foams or fibrous materials) are generally relatively light in weight and porous and serve to dissipate the vibration energy of sound waves over their relatively large surface areas. Helmholtz resonators (comprising, for example, a layer of air sandwiched between two elastic substrates) can also be employed as sound absorbers. For both types of absorbers, however, relatively thick structures are generally required in order to obtain relatively good absorption characteristics at relatively low audible frequencies (for example, approximately 50 millimeters (mm) thickness for frequencies less than about 500 hertz (Hz)), and such thick structures can be problematic for use in confined vehicular spaces.

In contrast with sound absorbers, traditional sound barriers tend to be relatively heavy and air-tight because the sound transmission loss from a material is generally a function of its mass and stiffness. The so-called "mass law" (applicable to many traditional acoustic barrier materials in certain frequency ranges) dictates that as the weight per unit area of a material is doubled, the transmission loss through the material increases by 6 decibels (dB). The weight per unit area can be increased by using denser materials or by increasing the thickness of the barrier. Added weight, however, can be undesirable in many transportation applications.

SUMMARY

Thus, we recognize that there is a need for sound insulation processes that can provide a relatively high level of sound attenuation or insulation (reducing or, preferably, eliminating sound transmission) in transportation vehicles by using sound insulation devices that are relatively small in external dimensions and/or relatively light in weight. Preferably, the devices can be at least partially effective over a relatively broad range of audible acoustic frequencies and/or can be relatively simply and cost-effectively prepared.

Briefly, in one aspect, this invention provides such a process, which comprises (a) providing at least one sound insulation device comprising at least one sound barrier comprising at least one substantially periodic array of structures disposed in a first medium having a first density, the structures being made of a second medium having a second density different from the first density, wherein one of the first and second media is a viscoelastic medium having a speed of propagation of longitudinal sound wave and a speed of propagation of transverse sound wave, the speed of propagation of longitudinal sound wave being at least about 30 times the speed of propagation of transverse sound wave, and wherein the other of the first and second media is a viscoelastic or elastic medium; and (b) interposing the sound insulation device between an acoustic source area (preferably, a source of audible acoustic frequencies) and an acoustic receiving area of a transportation vehicle (for example, an airplane, automobile, train, or boat). Preferably, the substantially periodic array of structures is a one-dimensional array in the form of a multi-layer structure comprising alternating layers of the first and second media. The sound insulation device preferably further comprises at least one high temperature-resistant material (as defined below).

It has been discovered that, by selecting viscoelastic materials having certain characteristics and combining them with viscoelastic or elastic materials to form spatially periodic arrays, phononic crystal structure band gaps or at least significant transmission losses (for example, greater than 20 decibels (dB)) can be obtained in at least portions of the audible range (that is, the range of 20 hertz (Hz) to 20 kilohertz (kHz)). Such sound barriers or phononic crystal structures can be relatively light in weight and relatively small (for example, having external dimensions on the order of a few centimeters or less). By controlling such design parameters as the selection of materials, the type of lattice structure, the spacing of the different materials, and so forth, the frequency of the band gap, the number of gaps, and their widths can be tuned, or, at a minimum, the transmission loss levels can be adjusted as a function of frequency.

The phononic crystal structures can generate acoustic band gaps in a passive, yet frequency selective way. Unlike the most common sound absorbers used in the acoustics industry, phononic crystals control sound in transmission mode. Within the range of frequencies of the band gap, there can be essentially no transmission of an incident sound wave through the structure. The band gap is not always absolute (that is, no sound transmission), but the sound transmission loss can often be on the order of 20 decibels (dB) or more. In the acoustic industry, attenuations on the order of 3 dB are considered significant, so 20+dB is a very significant loss in transmission, approaching 100 percent reduction in acoustic power.

Phononic crystal structures can be placed between a sound source and a receiver to allow only select frequencies to pass through the structure. The receiver thus hears filtered sound, with undesirable frequencies being blocked. By properly configuring the phononic crystal structure, the transmitted frequencies can be focused at the receiver, or the undesirable frequencies can be reflected back to the sound source (much like a frequency selective mirror). Unlike current acoustic materials, the phononic crystal structures can be used to actually manage sound waves, rather than simply to attenuate or reflect them.

Surprisingly, sound insulation devices comprising such sound barriers or phononic crystal structures, despite being relatively thin and relatively light in weight, when included in a transportation vehicle can provide sound transmission losses greater than about 20 dB at frequencies above about 300 Hz. In contrast with conventional transportation vehicle insulators, which generally obey the above-referenced mass law, the sound insulation devices used in the process of the invention can provide transmission losses that exceed those predicted by the mass law by about 3-4 dB at frequencies of about 150 Hz and above. The devices can be effective at ambient temperatures, as well as at temperatures significantly lower or higher than ambient (for example, temperatures ranging from about −80° C. to about +150° C., with only a few dB loss in performance relative to room temperature of about 23° C.). In addition, sound insulation devices that further comprise at least one high temperature-resistant (preferably, flame-resistant; more preferably, flame propagation-resistant and flame penetration-resistant; most preferably, burnthrough-resistant; as defined below) material can be used in transportation applications (for example, air and rail) where fire retardancy is a major concern and still provide effective acoustical insulation.

Thus, the process of the invention, in at least some embodiments, can meet the above-cited need for sound insulation processes that can be at least partially effective at audible acoustic frequencies (surprisingly, even at audible frequencies below about 1000 Hertz) in transportation vehicles, while utilizing sound insulation devices that are relatively small in external dimensions and/or relatively light in weight. The sound insulation process of the invention can be used to provide sound insulation in a variety of different vehicular environments in which weight reduction, thickness reduction, and/or high temperature resistance can be important. For example, such use can include placement of the sound insulation device in either interior or exterior vehicular components (or both) in airplanes (for example, for sound insulation around the fuselage and in passenger compartment panels), in automobiles (for example, in floor boards, dash boards, wheel wells, and headliners), and the like.

In another aspect, this invention also provides a sound insulation device comprising (a) at least one sound barrier comprising at least one substantially periodic array of structures disposed in a first medium having a first density, the structures being made of a second medium having a second density different from the first density, wherein one of the first and second media is a viscoelastic medium having a speed of propagation of longitudinal sound wave and a speed of propagation of transverse sound wave, the speed of propagation of longitudinal sound wave being at least about 30 times the speed of propagation of transverse sound wave, and wherein the other of the first and second media is a viscoelastic or elastic medium; and (b) at least one high temperature-resistant (preferably, flame-resistant; more preferably, flame propagation-resistant and flame penetration-resistant; most preferably, burnthrough-resistant; as defined below) material. Preferably, the substantially periodic array of structures is a one-dimensional array in the form of a multi-layer structure comprising alternating layers of the first and second media.

BRIEF DESCRIPTION OF DRAWING

These and other features, aspects, and advantages of the present invention will become better understood with regard to the following description, appended claims, and accompanying drawing, wherein:

DETAILED DESCRIPTION

Definitions

Figure 1:
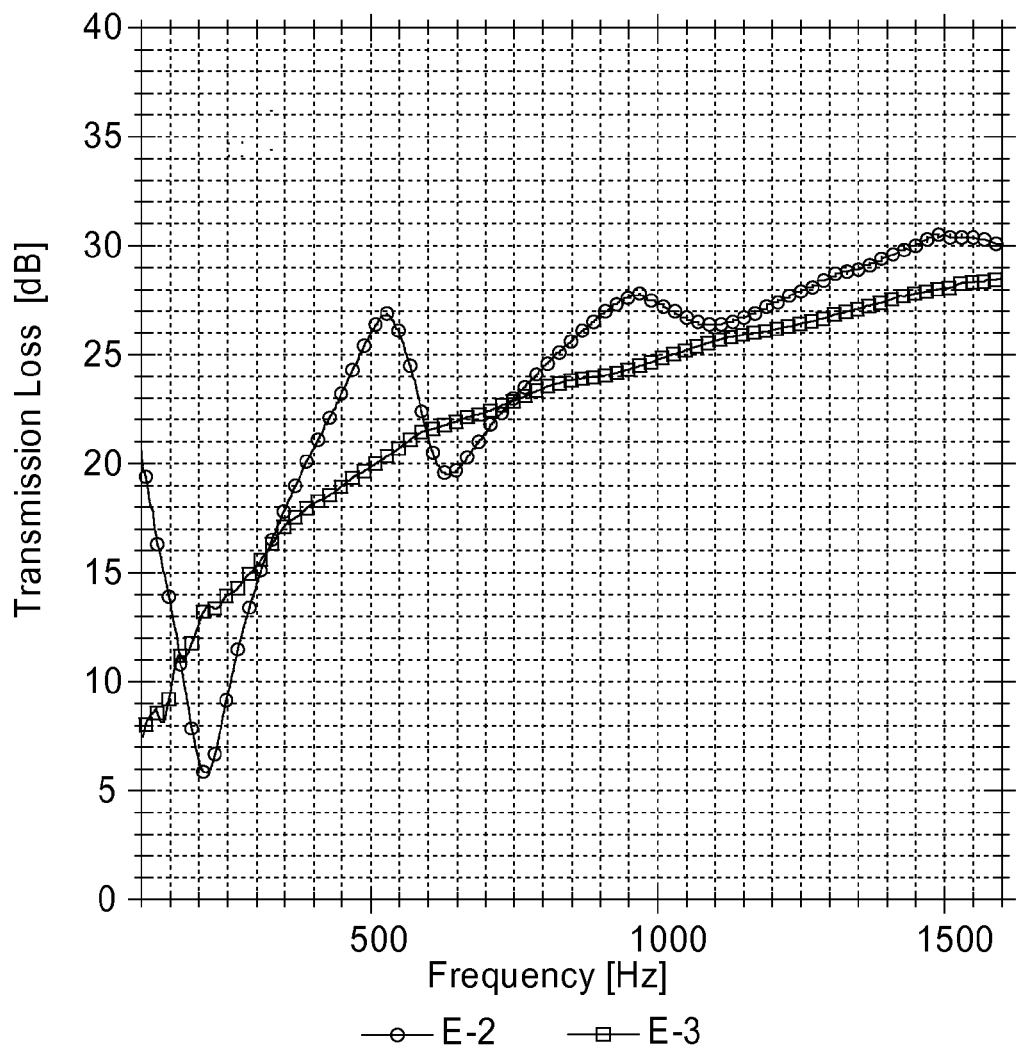
FIG. 1 is a plot of transmission loss (in dB) versus frequency (in Hz) for the embodiments of the process of the invention described in Examples 2 and 3.

As used in this patent application:

"high temperature-resistant material" means a material that does not melt, flow, decompose, or otherwise substantially change shape at temperatures up to at least about 500° C.;

"flame-resistant material" means a material that meets the flammability requirements of the Federal Aviation Administration set forth at 14 C.F.R. Part 25, Sections 25.853(a) and 25.855(d) (which reference Part I of Appendix F to Part 25), the texts of which are incorporated herein by reference;

"flame propagation-resistant material" means a material that meets the flammability requirements of the Federal Aviation Administration set forth at 14 C.F.R. Part 25, Section 25.856(a) (which references Part VI of Appendix F to Part 25), the texts of which are incorporated herein by reference;

"flame penetration-resistant material" means a material that meets the flammability requirements of the Federal Aviation Administration set forth at 14 C.F.R. Part 25, Section 25.856(b) (which references Part VII of Appendix F to Part 25), the texts of which are incorporated herein by reference; and "burnthrough-resistant material" means a material that meets the flammability requirements of the Federal Aviation Administration set forth at 14 C.F.R. Part 25, Sections 25.853 (a) and 25.855(d) (which reference Part I of Appendix F to Part 25), as well as those set forth at 14 C.F.R. Part 25, Sections 25.856(a) (flame propagation) and 25.856(b) (flame penetration) (which reference Parts VI and VII, respectively, of Appendix F to Part 25), the texts of which are incorporated herein by reference.

Sound Barrier Materials

Materials that are suitable for use as the above-referenced viscoelastic components of the sound barrier used in the process of the invention include those viscoelastic solids and liquids having (preferably, at least in the audible range of acoustic frequencies) a speed of propagation of longitudinal sound wave that is at least about 30 times (preferably, at least about 50 times; more preferably, at least about 75 times; most preferably, at least about 100 times) its speed of propagation of transverse sound wave. Useful viscoelastic solids and liquids include those having a steady shear plateau modulus ($G°_N$) of less than or equal to about $5×10^6$ Pascals (Pa) at ambient temperatures (for example, about 20° C.), the steady shear plateau modulus preferably extending from about 30 Kelvin degrees to about 100 Kelvin degrees above the glass transition temperature ($T_g$) of the material. Preferably, at least one of the viscoelastic materials in the sound barrier has a steady shear plateau modulus of less than or equal to about $1 \times 10^6$ Pa (more preferably, less than or equal to about $1 \times 10^5$ Pa) at ambient temperatures (for example, about 20° C.).

Examples of such viscoelastic materials include rubbery polymer compositions (for example, comprising lightly-crosslinked or semi-crystalline polymers) in various forms including elastomers (including, for example, thermoplastic elastomers), elastoviscous liquids, and the like, and combinations thereof (preferably, for at least some applications, elastomers and combinations thereof). Useful elastomers include both homopolymers and copolymers (including block, graft, and random copolymers), both inorganic and organic polymers and combinations thereof, and polymers that are linear or branched, and/or that are in the form of interpenetrating or semi-interpenetrating networks or other complex forms (for example, star polymers). Useful elastoviscous liquids include polymer melts, solutions, and gels (including hydrogels).

Preferred viscoelastic solids include silicone rubbers (preferably, having a durometer hardness of about 20 A to about 70 A; more preferably, about 30 A to about 50 A), (meth)acrylate (acrylate and/or methacrylate) polymers (preferably, copolymers of isooctylacrylate (IOA) and acrylic acid (AA)), ethylene-vinyl acetate (EVA) copolymers, block copolymers (preferably, comprising styrene, ethylene, and butylene), cellulosic polymers (preferably, cork), blends of organic polymer (preferably, a polyurethane) and polydiorganosiloxane polyamide block copolymer (preferably, a silicone polyoxamide block copolymer), neoprene, and combinations thereof. Preferred viscoelastic liquids include mineral oil-modified block copolymers, hydrogels, and combinations thereof.

Such viscoelastic solids and liquids can be prepared by known methods. Many are commercially available.

Materials that are suitable for use as the above-referenced elastic component of the sound barrier of the invention include essentially all elastic materials. Preferred elastic materials, however, include those having a longitudinal speed of sound that is at least about 2000 meters per second (m/s).

Useful classes of elastic solids include metals (and alloys thereof), glassy polymers (for example, cured epoxy resin), composite materials (for example, glass, metal, or carbon fibers (or another particulate form such as flakes or powder) in a polymer matrix), and the like, and combinations thereof. Preferred classes of elastic solids include metals, metal alloys, glassy polymers, and combinations thereof (more preferably, copper, aluminum, epoxy resin, copper alloys, aluminum alloys, and combinations thereof; even more preferably, copper, aluminum, copper alloys, aluminum alloys, and combinations thereof; yet more preferably, aluminum, aluminum alloys, and combinations thereof; most preferably, aluminum).

Such elastic materials can be prepared or obtained by known methods. Many are commercially available.

If desired, the sound barrier of the process of the invention can optionally comprise other component materials. For example, the sound barrier can include more than one viscoelastic material (including one or more viscoelastic materials that do not have a speed of propagation of longitudinal sound wave that is at least about 30 times its speed of propagation of transverse sound wave, provided that at least one viscoelastic material in the sound barrier meets this criterion) and/or more than one of the above-described elastic materials. The sound barrier can optionally include one or more inviscid fluids.

Preparation of Sound Barrier

The sound barrier used in the process of the invention comprises a substantially periodic (one-, two-, or three-dimensional) array of structures disposed in a first medium having a first density, the structures being made of a second medium having a second density different from the first density, as described above. Such an array can be formed by using either an above-described viscoelastic material or an above-described elastic material (or, as an alternative to an elastic material, a second, different viscoelastic material) as the first medium and the other of the two as the second medium.

The resulting structure or phononic crystal can be a macroscopic construction (for example, having a size scale on the order of centimeters or millimeters or less). If desired, the phononic crystal can take the form of a spatially periodic lattice with uniformly-sized and uniformly-shaped inclusions at its lattice sites, surrounded by a material that forms a matrix between the inclusions. Design parameters for such structures include the type of lattice (for example, square, triangular, and so forth), the spacing between the lattice sites (the lattice constant), the make-up and shape of the unit cell (for example, the fractional area of the unit cell that is occupied by the inclusions—also known as f, the so-called "fill factor"), the physical properties of the inclusion and matrix materials (for example, density, Poisson ratio, modulus, and so forth), the shape of the inclusion (for example, rod, sphere, hollow rod, square pillar, and so forth), and the like. By controlling such design parameters, the frequency of the resulting band gap, the number of gaps, and their widths can be tuned, or, at a minimum, the level of transmission loss can be adjusted as a function of frequency.

Preferably, the substantially periodic array of structures is a one-dimensional array in the form of a multi-layer structure comprising alternating layers of the first and second media (and, if desired, further comprising one or more of the above-described optional components in the form of one or more layers; for example, an "ABCD" structure, an "ACDB" structure, an "ACBD" structure, and so forth can be formed from the first (A) and second (B) media and two additional components C and D). The total number of layers of the multi-layer structure can vary over a wide range, depending upon the particular materials that are utilized, the layer thicknesses, and the requirements of a particular acoustic application.

For example, the total number of layers of the multi-layer structure can range from as few as two layers to as high as hundreds of layers or more. Layer thicknesses can also vary widely (depending upon, for example, the desired periodicity) but are preferably on the order of centimeters or less (more preferably, on the order of millimeters or less; most preferably, less than or equal to about 10 mm). Such layer thicknesses and numbers of layers can provide phononic crystal structures having dimensions on the order of centimeters or less (preferably, less than or equal to about 100 mm; more preferably, less than or equal to about 50 mm; even more preferably, less than or equal to about 10 mm; most preferably, less than or equal to about 5 mm). If desired, the layers can be cleaned (for example, using surfactant compositions or isopropanol) prior to assembly of the structure, and one or more bonding agents (for example, adhesives or mechanical fasteners) can optionally be utilized (provided that there is no significant interference with the desired acoustics and/or fire retardancy characteristics).

A preferred embodiment of the multi-layer structure comprises from about 3 to about 10 (more preferably, from about 3 to about 5) alternating layers of viscoelastic material (preferably, silicone rubber, acrylate polymer, ethylene-vinyl acetate copolymer, or a combination thereof) having a layer thickness of about 0.75 mm to about 1.25 mm and an elastic material (preferably, aluminum, epoxy resin, aluminum alloy, or a combination thereof) having a layer thickness of about 0.025 mm to about 1 mm. This can provide a phononic crystal structure having preferred dimensions on the order of about 1 mm to about 10 mm (more preferably, about 2 mm to about 4 mm; most preferably, about 2 mm to about 3 mm).

High Temperature-Resistant Material

Suitable high temperature-resistant materials for use in the sound insulation device used in the process of the invention include ceramic papers (for example, aluminosilicate ceramic fiber papers commercially available as KAOWOOL Paper from Thermal Ceramics, Inc., Augusta, Ga., and under the trade designation LYTHERM Paper from Lydall, Inc. of Rochester, N.H., as well as a ceramic fiber paper encapsulated in polyimide film available as 3M NEXTEL Flame Shield AL-1 from 3M Company, St. Paul, Minn.), woven ceramic fibers (for example, fabrics commercially available under the trade designation NEXTEL 312 AF-10 Aerospace Fabric from 3M Company, St. Paul, Minn.), woven fiberglass fibers (for example, fabrics commercially available under the trade designation SILTEMP Silica Fabric Type 84CH from Ametek of Wilmington, Del.), ceramic non-woven scrims (for example, scrims prepared from ceramic oxide fibers commercially available under the trade designation NEXTEL 312 Ceramic Fibers from 3M Company, St. Paul, Minn.), and fiberglass non-woven scrims. Such materials can be manufactured by known methods. Suitable high temperature-resistant materials include those described in U.S. Pat. No. 6,670,291 (Tompkins et al.), the description of which is incorporated herein by reference.

Preferred high temperature-resistant materials are flame-resistant materials (for example, aluminosilicate ceramic fiber papers and S-glass paper). More preferred high temperature-resistant materials are both flame propagation-resistant and flame penetration-resistant. Most preferred high temperature-resistant materials are burnthrough-resistant materials (for example, ceramic papers such as 3M NEXTEL Flame Stopping Dot Paper, available from 3M Company, St. Paul, Minn., and vermiculite-coated ceramic paper available as 3M NEXTEL Flame Stopping Coated Paper from 3M Company, as well as NOMEX Type 418 Paper available from DuPont, Richmond, Va.).

Preparation and Use of Sound Insulation Device

Sound insulation devices suitable for use in the process of the invention include those that comprise (a) at least one of the above-described sound barriers; and (b) optionally (but preferably), at least one high temperature-resistant material. Preferably, the substantially periodic array of structures of the sound barrier of the sound insulation device is a one-dimensional array in the form of a multi-layer structure comprising alternating layers of the first and second media.

If desired, the sound insulation device can comprise one or more layers of high-temperature resistant material. When used, the high temperature-resistant material (for example, in the form of a sheet) is preferably applied to one or more of the outermost surfaces of the sound barrier (preferably, as the outermost layers of a multi-layer sound barrier structure). In addition, other materials and/or layers conventionally found in transportation vehicle components can be included in the sound insulation device.

For example, the device can further comprise one or more adhesive compositions or films (which can be used, for example, to attach the high temperature-resistant material to the sound barrier), one or more scrims (for example, woven polymeric fabric), one or more water repellent coatings, one or more intumescent additives or coatings, and one or more polymer films (which can optionally be metallized), as well as flame retardants, antistatic agents, anti-mildew agents, and the like. Such other materials and/or layers can be attached to the outside of the sound barrier, or the sound barrier itself can comprise such materials and/or layers, provided in either case that the substantial periodicity and acoustical characteristics of the sound barrier are not unacceptably disrupted or altered. When casing-free sound insulation devices are desired, the additional materials and/or layers are preferably selected so as to not significantly increase the moisture uptake and retention characteristics of the device.

The sound insulation device can be used in the sound insulation process of the invention by interposing or placing the device between an acoustic source area (preferably, a source of audible acoustic frequencies) and an acoustic receiving area (preferably, a receiver of audible acoustic frequencies) of a transportation vehicle. Useful acoustic sources include road noise, wind noise, engine noise, and the like (preferably, noises or other sounds having an audible component; more preferably, noises or other sounds having a frequency component in the range of about 500 Hz to about 1500 Hz).

The sound insulation device can significantly attenuate sound waves passing from an acoustical source area of a vehicle (for example, an engine compartment, driveline, wheels, exterior panels, or the like) to a receiving area of a vehicle (for example, a firewall, floor pan, door panels, headliner, other interior trim, or the like). The device can be positioned between the source area and the receiving area such that a major face of the sound barrier of the device intercepts and thereby attenuates sound waves passing from the source area to the receiving area.

Those skilled in the art will be familiar with a variety of ways in which such devices can be so positioned. Normal incidence of the sound waves (relative to a major face of the sound barrier of the device) is generally preferred, although field incidence conditions (random orientation) can also provide reasonably effective acoustical attenuation (for example, with increases of no more than about 5 dB in transmission, relative to normal incidence conditions, when a one-dimensional, multi-layer sound barrier is utilized). If desired, the sound barrier of the sound insulation device can be used as an acoustic absorber (for example, by positioning the sound barrier relative to a substrate (for example, a floor or panel) such that it can function as a Helmholtz resonator-type absorber). The sound insulation device can be directly or indirectly attached to or suspended within a transportation vehicle component by essentially any known or hereafter-developed method (for example, use of adhesives, mechanical fasteners, form-fitting, and/or the like) that does not unacceptably disrupt or alter the substantial periodicity of the sound barrier of the device or its acoustical characteristics.

The sound insulation process and device of the invention can be used to achieve transmission loss across a relatively large portion of the audible range (with preferred embodiments providing a transmission loss that is greater than or equal to about 20 dB across the range of about 800 Hz to about 1500 Hz; with more preferred embodiments providing a transmission loss that is greater than or equal to about 20 dB across the range of about 500 Hz to about 1500 Hz; with even more preferred embodiments providing a transmission loss that is greater than or equal to about 20 dB across the range of about 250 Hz to about 1500 Hz; and with most preferred embodiments providing substantially total transmission loss across at least a portion of the range of about 500 Hz to about 1500 Hz). Such transmission losses can be achieved while maintaining phononic crystal structure dimensions on the order of centimeters or less (preferably, less than or equal to about 20 cm; more preferably, on the order of millimeters or less; most preferably, on the order of about 1 to about 3 mm).

In addition to one or more of the above-described sound barriers, the sound insulation device can optionally further comprise one or more conventional or hereafter-developed sound insulators (for example, conventional absorbers, barriers, and the like). If desired, such conventional sound insulators can be layered, for example, to broaden the frequency effectiveness range of the device.

EXAMPLES

Objects and advantages of this invention are further illustrated by the following examples, but the particular materials and amounts thereof recited in these examples, as well as other conditions and details, should not be construed to unduly limit this invention. All parts, percentages, ratios, and the like in the examples are by weight, unless noted otherwise. Solvents and other reagents were obtained from Sigma-Aldrich Chemical Company, St. Louis, Mo. unless otherwise noted.

Test Methods
Transmission Loss Measurements

Transmission loss measurements were carried out by using a Brüel & Kjær Impedance Tube System Type 4206 (100 mm tube, Brüel & Kjær Sound & Vibration Measurement A/S, Denmark). A four-microphone transfer-function test method was used for measurements of transmission loss in the frequency range of 50 Hz to 1.6 kHz.

In brief, the tube system was composed of source, holder, and receiving tubes of 100 mm internal diameter. Each test sample was set up with two rubber o-rings inside the holder tube located between the source and receiving tubes. A loudspeaker (4 ohms ($\Omega$) impedance, 80 mm diameter) mounted at the end of the source tube was used as a generator of sound plane waves. Four 0.64 cm (¼ inch) condenser microphones of Type 4187 were used to measure the sound pressure levels on both sides of the test sample (two in the source tube and two in the receiving tube). The two microphones in the source tube were used to determine incoming and reflected plane waves. The two other microphones located in the receiving tube were used to determine absorbed and transmitted portions.

By measuring sound pressure at the four microphone locations and calculating the complex transfer function using a four-channel digital frequency analyzer according to the procedure described by Olivieri, O., Bolton, J. S., and Yoo, T. in *"Measurement of Transmission Loss of Materials Using a Standing Wave Tube"*, INTER-NOISE 2006, 3-6 Dec. 2006, Honolulu, Hi., USA, the transmission loss of the test sample was determined. PULSE version 11 data acquisition and analysis software (Briiel & Kjer) was utilized.

For each structure, a test sample was prepared. All test samples were cut with a 99.54 mm diameter precision die. Transmission loss measurements were repeated three times for each test sample. The resulting transmission loss for each structure was calculated as the arithmetical average of the three measurements.

Rheological Measurements

Rheological properties (for example, steady shear plateau modulus) were determined by carrying out linear, isothermal frequency sweep Dynamic Mechanical Analysis (DMA) tests in extensional mode on a test sample of material in a commercial ARES dynamic rheometer (available through TA Instruments of New Castle, Del.). The resulting data were then shifted using the Time-Temperature Superposition Principle to yield dynamic master curves at a selected reference temperature (taken as room temperature of 22.7° C.). The horizontal shift factors that were used for the shifting of the dynamic master curves were checked and found to obey the Williams-Landel-Ferry (WLF) form. The resulting dynamic master curves were finally converted to steady linear extensional modulus master curves at room temperature (22.7° C.) by means of the Ninomiya-Ferry (NF) procedure. The value of the rubbery tensile modulus plateau was determined from the steady linear extensional modulus master curve, and the steady shear plateau modulus of the material was taken to be one-third of the rubbery extensional modulus plateau value. (See, for example, the discussion of rheological data analysis techniques by John D. Ferry in *Viscoelastic Properties of Polymers*, 2nd Edition, John Wiley & Sons, Inc., New York (1980).)

Federal Aviation Regulations Thermal/Acoustic Insulation Flame Propagation Test (FAR 25.856-1)

Radiant panel testing was used to determine the flammability and flame propagation characteristics of sound insulation devices of the invention when exposed to both a radiant heat source and a flame. The testing was carried out according to the methods set forth by the Federal Aviation Administration at 14 C.F.R. Part 25, Section 25.856(a) (which references Part VI of Appendix F to Part 25), the texts of which are incorporated herein by reference. Full details of the test method are available in the U.S. Department of Transportation, Federal Aviation Administration (FAA), Advisory Circular AC No: 25.856-1 (dated Jun. 24, 2005; www.fire.tc.faa.gov).

Materials

Silicone Rubber No. 1: Item number 86915K24 available from McMaster-Carr Inc., Elmhurst, Ill., durometer hardness 40A, thickness 0.8 mm, with acrylic adhesive backing, steady shear plateau modulus of $4.3 \times 10^5$ Pa at room temperature of 22.7° C. determined essentially as described above Silicone Rubber No. 2: Item number 86915K14 available from McMaster-Carr Inc., Elmhurst, Ill., durometer hardness 40 A, thickness 0.8 mm, without adhesive backing Aluminum: Aluminum foil, thickness 0.03 mm, sold commercially under the brand name of Reynolds Wrap™, available from Alcoa Corp., Pittsburgh, Pa.

High Temperature-Resistant Material: 3M™ Nextel™ Flame Shield AL-1, a flame barrier comprising ceramic fiber paper encapsulated in polyimide film, available from 3M Company, St. Paul, Minn.

Adhesive No. 1: 3M™ Scotch-Weld™ 7246-2 B/A FST two-part structural epoxy adhesive, available from 3M Company, St. Paul, Minn.

Adhesive No. 2: Dow Corning™ Q2-7406 High Temperature Silicone Pressure Sensitive Adhesive (PSA), polydimethylsiloxane gum and resin, 55% solids, available from Dow Chemical Company, Midland, Mich.

Example 1

A five-layer structure was constructed by assembling layers of the above-described materials as shown in Table 1 below. First, Silicone No. 1 and Aluminum layers were laminated together by using the adhesive backing associated with each of two sheets (each having dimensions of 0.8 mm by 305 mm by 305 mm) of Silicone No. 1. The silicone sheets were laminated to an interposed sheet of Aluminum (having dimensions of 0.03 mm by 305 mm by 305 mm) to provide a three-layer structure.

The back side of the three-layer structure (the side to be placed opposite to a flame during flammability testing) was coated with Adhesive No. 1. Parts A and B of Adhesive No. 1 were mixed in a 1:1 ratio, and the resulting adhesive mixture was distributed uniformly on the back side of the structure by using a wooden stick (to provide a coating thickness of less than 1 mm). The resulting coated back side was adhered to a sheet of High Temperature-Resistant Material.

The front side of the structure (the side to be exposed to a flame during flammability testing) was coated with the adhesive mixture and adhered to another sheet of High Temperature-Resistant Material, essentially as described above. This provided a five-layer structure having High Temperature-Resistant Material as the outermost layers. The five-layer structure was kept under a 4 kg weight overnight and was then trimmed to a final size of 203 mm by 203 mm (8 inches by 8 inches) for carrying out the flammability test.

The flammability of the resulting structure was tested according to the above-referenced FAR 25.856(a) test procedure. The structure passed the test (thereby meeting the requirements of the associated FAA regulations).

Examples 2 and 3

For Example 2, a five-layer structure was constructed by assembling layers of the above-described materials as shown in Table 1 below. First, an adhesive/catalyst solution was prepared by mixing 10 weight percent (%) benzoyl peroxide in toluene with Adhesive No. 2 to provide a 1.5 weight % peroxide concentration (based on adhesive solids). Silicone No. 2 and Aluminum layers were laminated together by applying the adhesive/catalyst solution to two sheets of Silicone No. 2 (each having dimensions of 0.8 mm by 305 mm by 305 mm) using a #48 Meyer bar (0.109 mm (4.3 mil) wet film thickness). The resulting coated silicone sheets were heated at 60° C. for 10 minutes to drive off solvent. The coated silicone sheets were then laminated to an interposed sheet of Aluminum (having dimensions of 0.03 mm by 305 mm by 305 mm), and the resulting three-layer structure was heated at 100° C. to cure the adhesive.

The back side of the three-layer structure (the side to be placed opposite to a flame during flammability testing) was coated with the adhesive/catalyst solution, and the solvent was removed as described above. Yellow moisture barrier paper was removed from both sides of a sheet of High Temperature-Resistant Material by quickly exposing its surface to a flame (propane torch) and then delaminating the paper to provide bare ceramic fabric. The bare ceramic fabric was adhered to the coated back side of the three-layer structure, and the resulting four-layer structure was heated at 100° C. for 10 minutes to cure the adhesive.

The front side of the structure (the side to be exposed to a flame during flammability testing) was coated with the adhesive/catalyst solution, and the solvent was removed as described above. The resulting structure was then heated at 100° C. for 3 minutes to cure the adhesive before application of another sheet of High Temperature-Resistant Material, which was carried out as described above. This provided a five-layer structure having High Temperature-Resistant Material as the outermost layers. The five-layer structure was then trimmed to a final size of 203 mm by 203 mm (8 inches by 8 inches) for carrying out the flammability test.

The flammability of the resulting structure of Example 2 was tested according to the above-referenced FAR 25.856(a) test procedure. The structure passed the test (thereby meeting the requirements of the associated FAA regulations).

For Example 3, Example 2 was essentially repeated, except that no layers of High Temperature-Resistant Material (or their adjacent adhesive layers) were added to the three-layer structure (see Table 1 below). The sound attenuation or transmission loss characteristics of the multi-layer structures of Examples 2 and 3 were tested according to the above-described procedure to simulate acoustical performance in a transportation vehicle, and the results are shown in FIG. 1. The presence of the High Temperature-Resistant Material in the multi-layer structure of Example 2 did not significantly alter its acoustic attenuation properties relative to the multi-layer structure of Example 3, which did not comprise the High Temperature-Resistant Material.

Examples 4 and 5

For Example 4, Example 1 was essentially repeated, except that no layers of High Temperature-Resistant Material (or their adjacent adhesive layers) were added to the three-layer structure (see Table 1 below). For Example 5, a three-layer structure was prepared essentially as described in Example 4. The structure was then modified by adhering a sheet of Aluminum (same dimensions as previously) to one of the outermost layers of the structure (Silicone No. 1) by using an acrylic adhesive (3M™ 9472LE-LSE acrylic adhesive transfer tape having a thickness of 0.127 mm, available from 3M Company, St. Paul, Minn.) and then adhering another sheet of Silicone No. 1 (same dimensions as previously) to the resulting Aluminum layer by using the adhesive backing of the Silicone No. 1. This provided a five-layer structure having Silicone No. 1 as the outermost layers (see Table 1 below).

Figure 2:
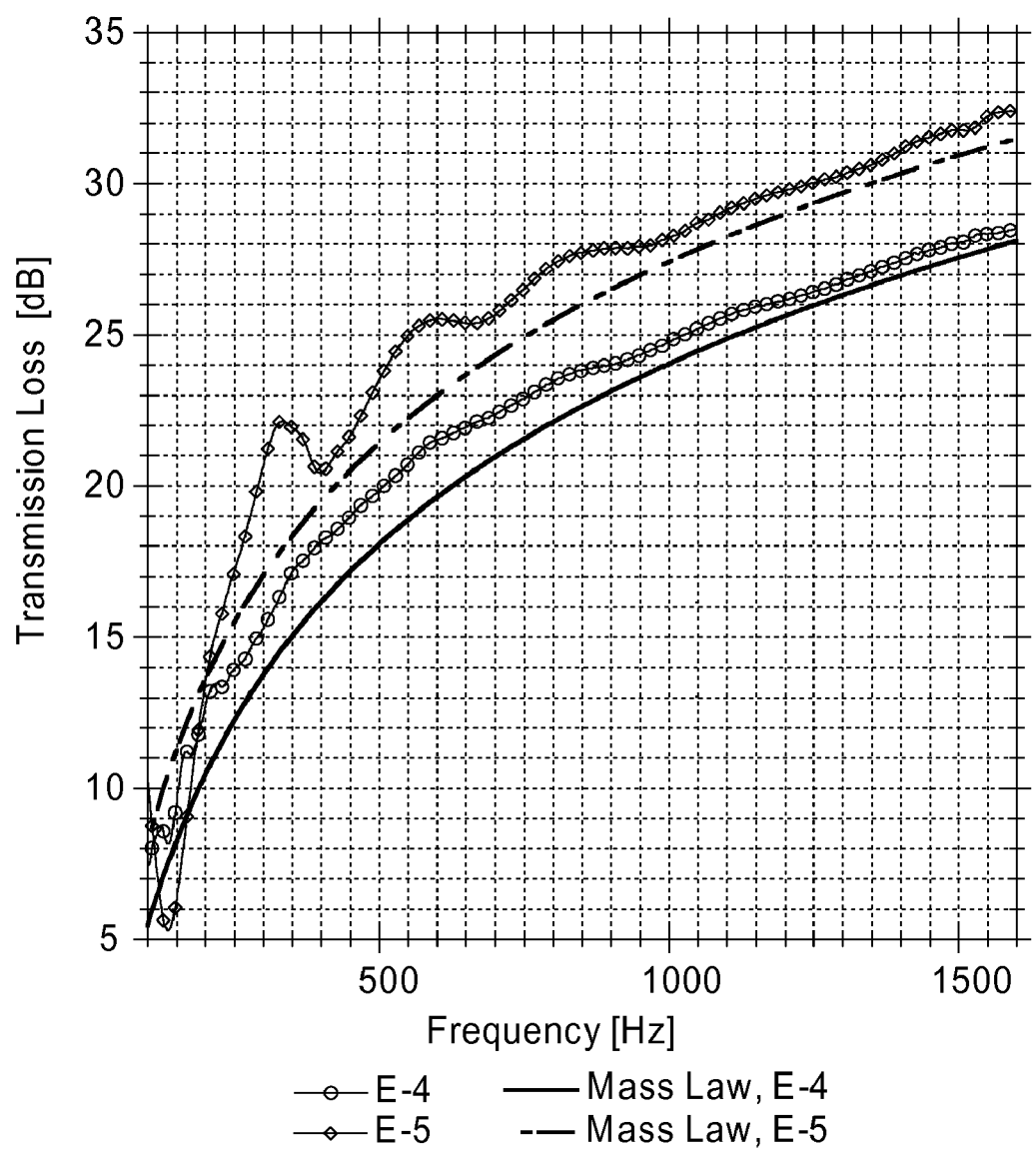
FIG. 2 is a plot of transmission loss (in dB; measured and theoretical (mass law) values) versus frequency (in Hz) for the embodiments of the process of the invention described in Examples 4 and 5.
Figure 3:
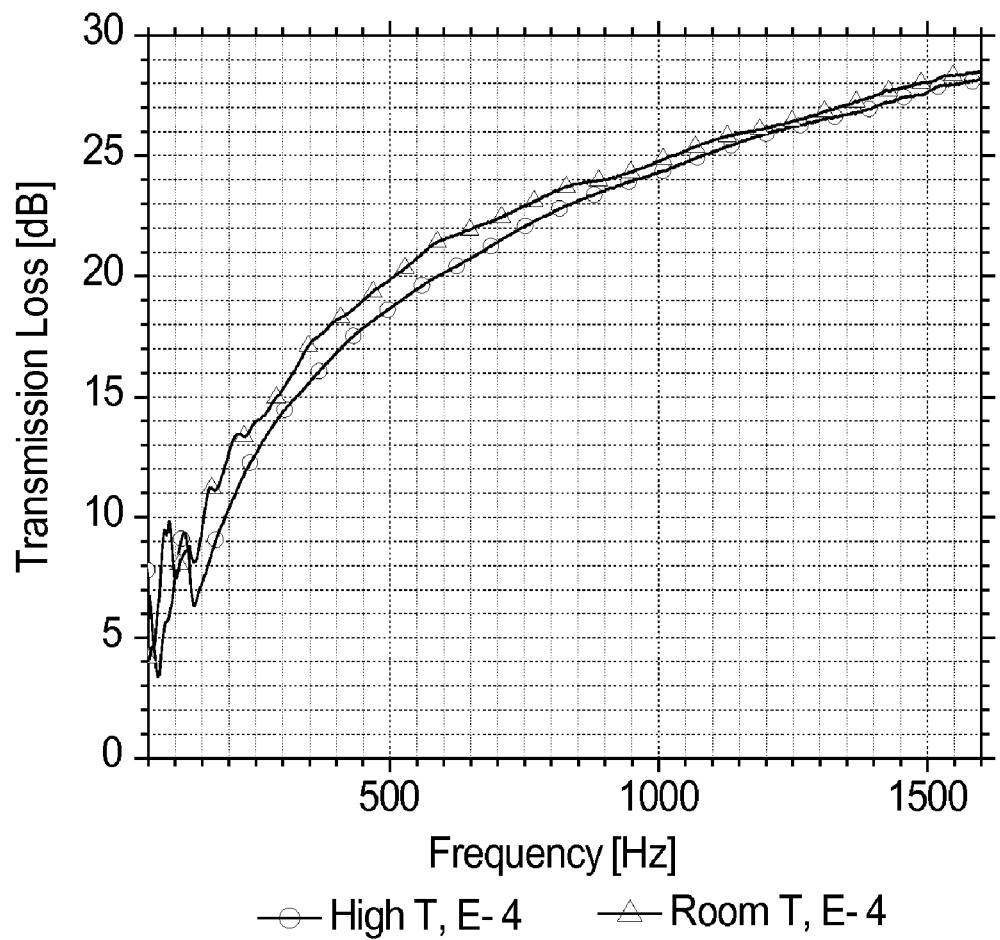
FIG. 3 is a plot of transmission loss (in dB; at two different temperatures) versus frequency (in Hz) for the embodiment of the process of the invention described in Example 4.
Figure 4:
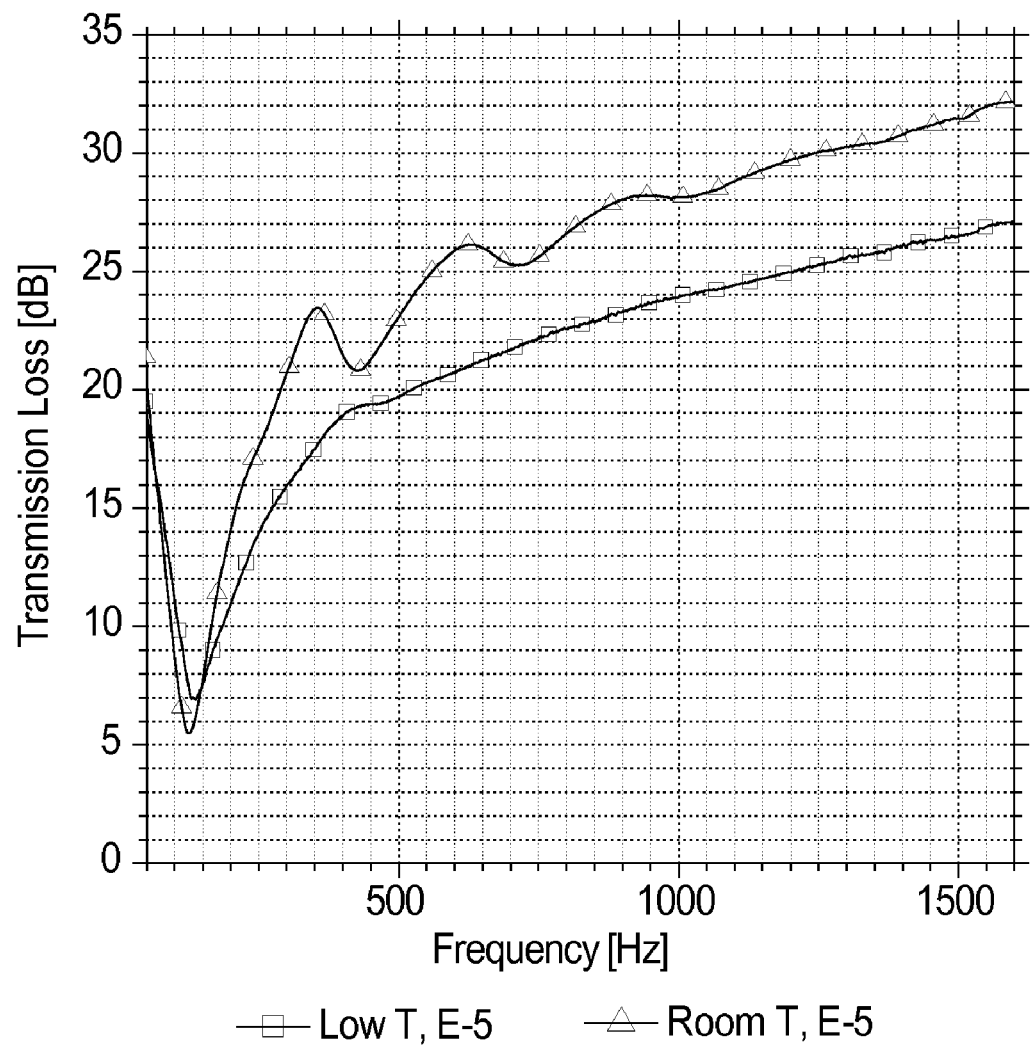
FIG. 4 is a plot of transmission loss (in dB; at two different temperatures) versus frequency (in Hz) for the embodiment of the process of the invention described in Example 5.

The normal incidence transmission losses of the multi-layer structures of Examples 4 and 5 were measured according to the above-described procedure to simulate acoustical performance in a transportation vehicle, and the results are shown in FIG. 2. These experimental transmission losses were compared with the respective theoretical normal incidence mass law values. The latter values were calculated according to the formula (see, for example, R. F. Barron, "Industrial Noise Control and Acoustics," Marcel Dekker, Inc., New York (2003), p. 112):

$$TL_n = 10\log_{10}\left[1 + \left(\frac{\pi f M_s}{\rho_1 c_1}\right)^2\right]$$

where $TL_n$ is the normal incidence transmission loss (in dB), $\log_{10}$ is the logarithm to the base 10, $\pi$ is the mathematical constant equal approximately to 3.14, $M_s$, is the multi-layer structure mass per unit area (in kg/m$^2$), $\rho_1$ and $c_1$ are the density (in kg/m$^3$) and speed of sound (in m/s), respectively, in the air surrounding the multi-layer structure, and f is the frequency (in Hz). The resulting calculated values of $TL_n$ are also shown in FIG. 2. The transmission loss characteristics of the multi-layer structures of Examples 4 and 5 were also tested according to the above-described procedure to simulate acoustical performance in a transportation vehicle under varying temperature conditions: at room temperature (about 23° C.) and at either low temperature (about −79° C.) or high temperature (about +100° C.). For the low temperature test, the structure was cooled between two plates of dry ice (solid carbon dioxide). The temperature between the plates was checked by thermocouple (≈−79° C.). For the high temperature test, the structure was heated to +150° C. in an oven (Thermolyne™ Type 1300 Furnace, Model # F-B1315M, Series 140, available from Thermolyne Sybron Corporation, Dubuque, Iowa, USA). The temperature of the heated structure immediately after performing the transmission loss measurement was about +100° C. (by infrared (IR) thermometer). The total testing time (taking structure from dry ice plates or from oven, positioning structure in B&K Impedance Tube, and performing measurement) was about 50 seconds. The results are shown in FIGS. 3 and 4.

TABLE 1

| Example Number | Multi-Layer Structure (Material A = Silicone No. 1; Material B = Silicone No. 2; Material C = Aluminum; Material D = High Temperature-Resistant Material) |
|---|---|
| 1 | DACAD |
| 2 | DBCBD |
| 3 | BCB |
| 4 | ACA |
| 5 | ACACA |

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows:

We claim:

1. A process comprising (a) providing at least one sound insulation device comprising at least one sound barrier comprising at least one substantially periodic array of structures disposed in a first medium having a first density, said structures being made of a second medium having a second density different from said first density, wherein one of said first and second media is a viscoelastic medium having a speed of propagation of longitudinal sound wave and a speed of propagation of transverse sound wave, said speed of propagation of longitudinal sound wave being at least 30 times said speed of propagation of transverse sound wave, and wherein the other of said first and second media is a viscoelastic or elastic medium, wherein said sound insulation device further comprises at least one high temperature-resistant material; and (b) interposing said sound insulation device between an acoustic source area and an acoustic receiving area of a transportation vehicle.

2. The process of claim 1, wherein said viscoelastic medium is selected from viscoelastic solids, viscoelastic liquids, and combinations thereof.

3. The process of claim 2, wherein said viscoelastic solids and said viscoelastic liquids are selected from rubbery polymer compositions and combinations thereof.

4. The process of claim 3, wherein said rubbery polymer compositions are selected from elastomers, elastoviscous liquids, and combinations thereof.

5. The process of claim 1, wherein said other of said first and second media is an elastic medium.

6. The process of claim 5, wherein said elastic medium is an elastic solid selected from metals, metal alloys, glassy polymers, composite materials, and combinations thereof.

7. The process of claim 1, wherein said substantially periodic array of structures is a one-dimensional array in the form of a multi-layer structure comprising alternating layers of said first and second media.

8. The process of claim 7, wherein said multi-layer structure comprises alternating layers of a viscoelastic medium and an elastic medium, said viscoelastic medium being selected from elastomers and combinations thereof, and said elastic medium being selected from metals, metal alloys, glassy polymers, and combinations thereof.

9. The process of claim 8, wherein said viscoelastic medium is selected from silicone rubbers, (meth)acrylate polymers, ethylene-vinyl acetate copolymers, block copolymers, cellulosic polymers, blends of organic polymer and polydiorganosiloxane polyamide block copolymer, neoprene, and combinations thereof; and said elastic medium is selected from copper, aluminum, copper alloys, aluminum alloys, and combinations thereof.

10. The process of claim 7, wherein said multi-layer structure comprises from 3 to 10 alternating layers of a viscoelastic material having a layer thickness of 0.75 mm to 1.25 mm and an elastic material having a layer thickness of 0.025 to 1 mm, said multi-layer structure having dimensions in the range of 1 mm to 10 mm.

11. The process of claim 10, wherein said multi-layer structure comprises from 3 to 5 alternating layers of said viscoelastic material and said elastic material; said viscoelastic material being selected from silicone rubbers, acrylate polymers, ethylene-vinyl acetate copolymers, and combinations thereof; said elastic material being selected from aluminum, epoxy resins, aluminum alloys, and combinations thereof; and said multi-layer structure having dimensions in the range of 2 mm to 4 mm.

12. The process of claim 1, wherein said sound barrier provides a transmission loss that is greater than or equal to 20 dB across the range of 800 Hz to 1500 Hz and has all dimensions less than or equal to 20 cm in size.

13. The process of claim 7, wherein said sound barrier provides a transmission loss that is greater than or equal to 20 dB across the range of 800 Hz to 1500 Hz and has all dimensions less than or equal to 20 cm in size.

14. The process of claim 1, wherein said high temperature-resistant material is a material that is both flame propagation-resistant and flame penetration-resistant, or that is burn-through-resistant.

15. A process comprising (a) providing at least one sound insulation device comprising at least one sound barrier comprising at least one one-dimensional, substantially periodic array of structures in the form of a multi-layer structure comprising alternating layers of a first medium having a first density and a second medium having a second density different from said first density, wherein one of said first and second media is a viscoelastic medium having a speed of propagation of longitudinal sound wave and a speed of propagation of transverse sound wave, said speed of propagation of longitudinal sound wave being at least 30 times said speed of propagation of transverse sound wave, and wherein the other of said first and second media is a viscoelastic or elastic medium; and (b) interposing said sound insulation device between an acoustic source area and an acoustic receiving area of a transportation vehicle selected from airplanes, trains, automobiles, boats, and combinations thereof.

16. The process of claim 15, wherein said first medium is a silicone rubber and said second medium is aluminum; and/or wherein said sound insulation device further comprises at least one high temperature-resistant material.

17. A sound insulation device comprising (a) at least one sound barrier comprising at least one substantially periodic array of structures disposed in a first medium having a first density, said structures being made of a second medium having a second density different from said first density, wherein one of said first and second media is a viscoelastic medium having a speed of propagation of longitudinal sound wave and a speed of propagation of transverse sound wave, said speed of propagation of longitudinal sound wave being at least about 30 times said speed of propagation of transverse sound wave, and wherein the other of said first and second media is a viscoelastic or elastic medium; and (b) at least one high temperature-resistant material.

18. The sound insulation device of claim 17, wherein said substantially periodic array of structures is a one-dimensional array in the form of a multi-layer structure comprising alternating layers of said first and second media.

19. The sound insulation device of claim 17, wherein said high temperature-resistant material is a material that is both flame propagation-resistant and flame penetration-resistant, or that is burnthrough-resistant.

* * * * *

UNITED STATES PATENT AND TRADEMARK OFFICE
CERTIFICATE OF CORRECTION

PATENT NO. : 8,276,709 B2
APPLICATION NO. : 13/140577
DATED : October 2, 2012
INVENTOR(S) : Ali Berker et al.

Page 1 of 1

It is certified that error appears in the above-identified patent and that said Letters Patent is hereby corrected as shown below:

On the Title Page, Item (75) (Inventors)
Line 3, Delete "Lesuffieur," and insert -- Lesuffleur, --, therefor.

Column 9
Line 50, Delete "(Briiel & Kjer)" and insert -- (Brüel & Kjær) --, therefor.

Column 12
Line 45, Delete "$M_s$," and insert -- $M_s$ --, therefor.

Signed and Sealed this
Twelfth Day of February, 2013

Teresa Stanek Rea
*Acting Director of the United States Patent and Trademark Office*